March 22, 1966     H. C. BRAUCHLA     3,241,671
VIBRATORY COMB SIZER

Filed Feb. 12, 1964     4 Sheets-Sheet 1

INVENTOR

Herbert C. Brauchla

BY *Semmes and Semmes*

ATTORNEYS

March 22, 1966  H. C. BRAUCHLA  3,241,671
VIBRATORY COMB SIZER
Filed Feb. 12, 1964  4 Sheets-Sheet 2

INVENTOR
Herbert C. Brauchla
BY Semmes and Semmes
ATTORNEYS

March 22, 1966  H. C. BRAUCHLA  3,241,671
VIBRATORY COMB SIZER
Filed Feb. 12, 1964  4 Sheets-Sheet 3

INVENTOR
Herbert C. Brauchla
BY Semmes and Semmes
ATTORNEYS

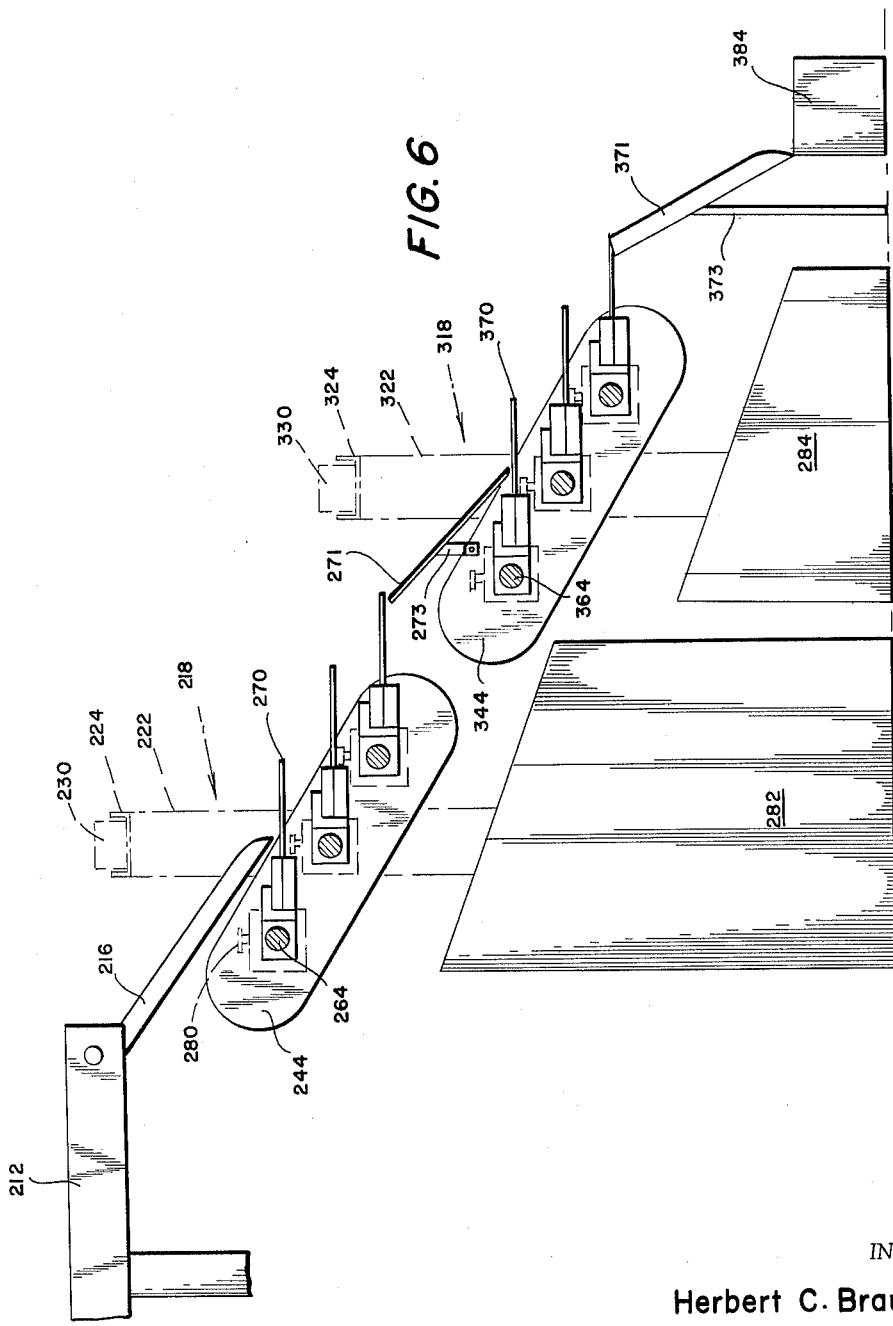

United States Patent Office 3,241,671
Patented Mar. 22, 1966

3,241,671
VIBRATORY COMB SIZER
Herbert C. Brauchla, P.O. Box 349, Oak Harbor Road, Fremont, Ohio
Filed Feb. 12, 1964, Ser. No. 344,416
3 Claims. (Cl. 209—243)

The present application relates to an apparatus for sizing matter, particularly an apparatus for separating particles having great size differential into categories of different sizes. For the purpose of this invention "sizing" is defined as the separating of material according to its size or dimensions and is specifically contrasted to "concentration" which is the separation of material according to its weight or specific gravity and without relation to its size. Conventionally, screens are employed for sizing of lightweight materials such as seeds or grains and heavier materials such as limestone or iron ores. A shortcoming of using screens is that they become clogged or impacted and must be reverse flushed or beaten to dislodge the compacted matter. Also, the compaction of matter in screens during use tends to distort the interstices of individual wires in the screens, resulting in inaccurate separation of the material desired to be sized.

According to the present invention, matter to be sized, such as a mixture of ragweed seeds and soybeans, is advanced downwardly as a relatively thin layer and onto a comb stairway or bed. A plurality of superposed, horizontally extending combs comprising the stairway is positioned beneath said advancing layer and laterally reciprocated. Undersized material, such as the ragweed seed, falls between the comb teeth and is recovered beneath the stairway. Oversized material, such as the soybean, drops from comb to comb as a waterfall into an oversized recovery bin positioned beyond the last comb step of the comb stairway. The effective sizing action of the individual combs may be enhanced by longitudinally rocking the combs so as to throw the advancing layer of matter to be sized from one comb onto the next lower comb. Also, both the rate and amplitude of reciprocation of the individual combs may be varied as a sizing control. This invention is not to be restricted to sizing of lightweight matter, for it is believed that sizing of the heavier ores may be readily accomplished, so long as the rate of feeding matter to be sized does not exceed the critical strength factor of the combing teeth.

Accordingly, it is an object of invention to combine an effective apparatus for sizing of materials having a wide variance in size.

Another object of invention is to provide an effective apparatus for sizing without the use of screens.

Additional objects of invention will become apparent from the ensuing specification and attached drawings wherein:

FIG. 6 is a side elevation of two comb stairways, the first or upper stairway having teeth spaced apart a greater distance and the second or lower stairway having teeth spaced apart a lesser distance.

Figure 1:
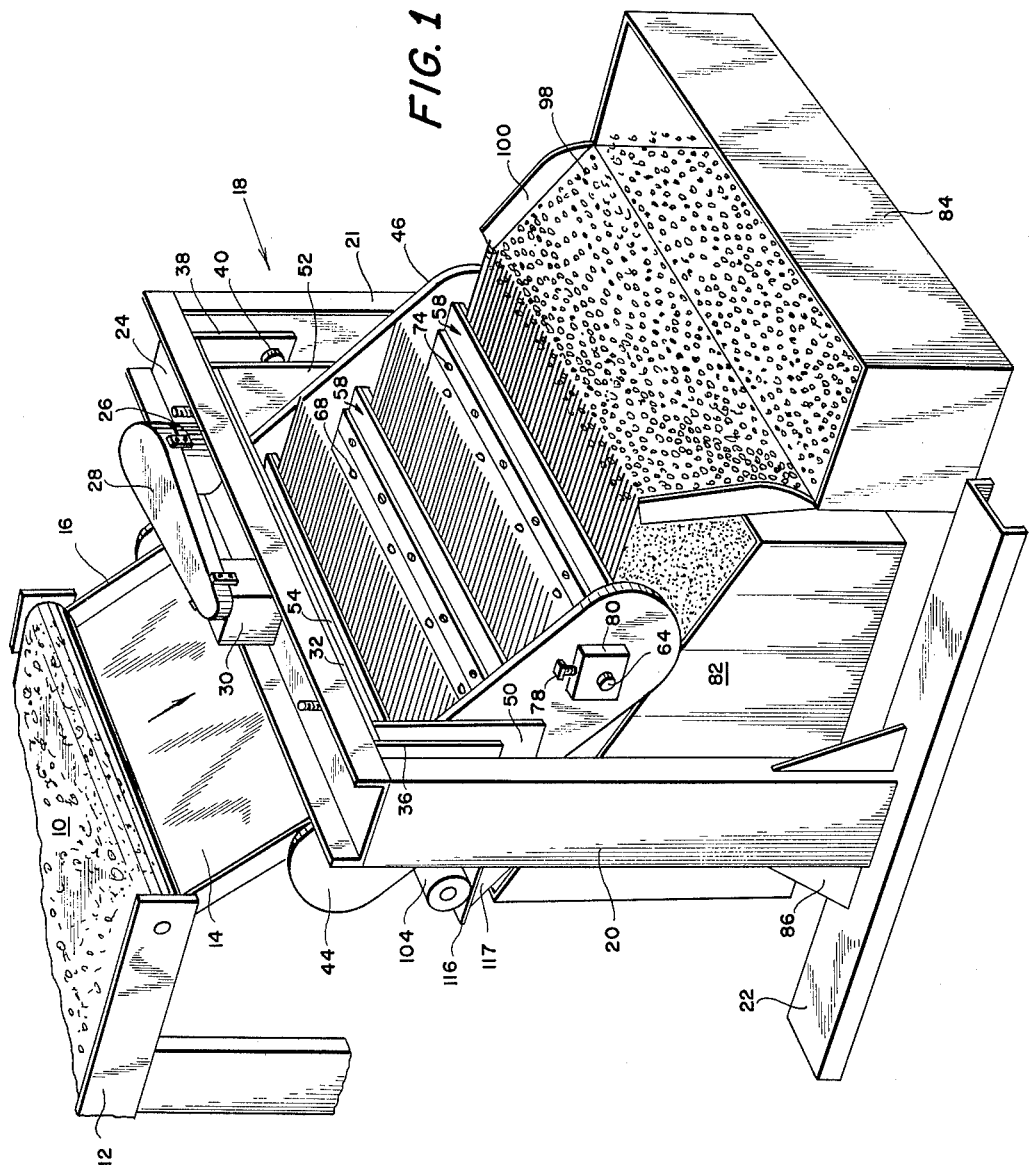
FIG. 1 is a perspective view of a proposed sizing apparatus wherein the matter to be sized is advanced as a thin layer onto a plurality of superposed, longitudinally extending combs.

In FIG. 1 a delivery conveyor belt 10 is illustrated as rotatably positioned upon a frame or table 12, having an inclined delivery chute 14, with upstanding flanges 16, mounted at table 12 and above the comb stairway sizing apparatus 18. Base channel members 22 support upstanding legs 20 by means of skirt elements 86. Legs 20 in turn support top piece 24 which has mounted thereon eccentric motor 26 connected to eccentric shaft 34 (FIG. 2) within eccentric block 30 by means of a chain or belt (not illustrated) protected by cover 28. Reference is made to U.S. Patent No. 3,206,028 of applicant for further description of such conventional eccentric motor assemblies.

Figure 2:
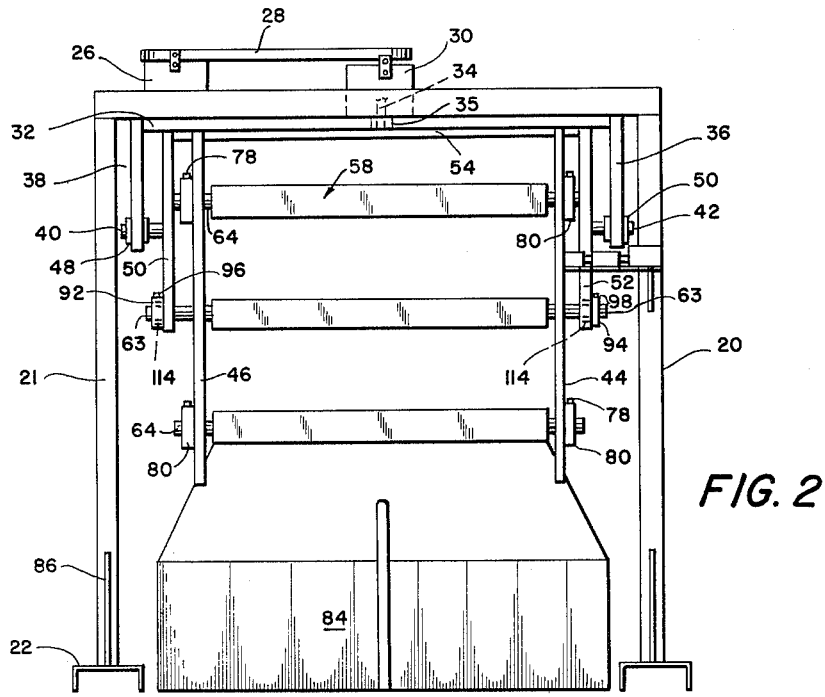
FIG. 2 is a rear elevation thereof, showing the eccentric or transverse reciprocating means mounted on top the sizing head.
Figure 3:
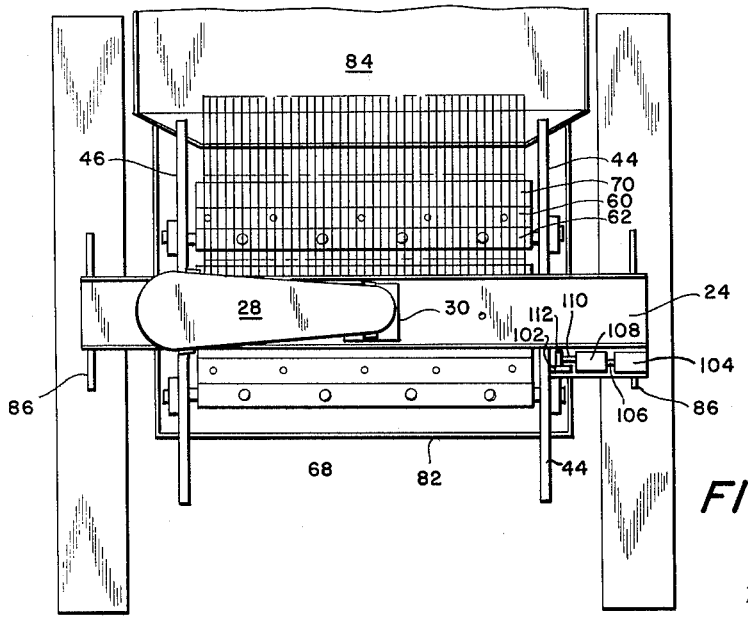
FIG. 3 is a top plan thereof.

A combing bolster plate 32 is supported beneath top piece 24 and has a channel, generally designated by the reference numeral 35 in FIG. 2, so that eccentric shaft 34 might pass therethrough and be secured into header piece 54. Side pieces 36, 38 are provided at either end of bolster plate 32 and have in their lower portions linear bearings 48 and 50 supporting transverse reciprocatory shafts 40 and 42. On the inside of shafts 40 and 42, there are secured comb support pieces 50 and 52 which are secured at their tops to header piece 54.

Figure 4:
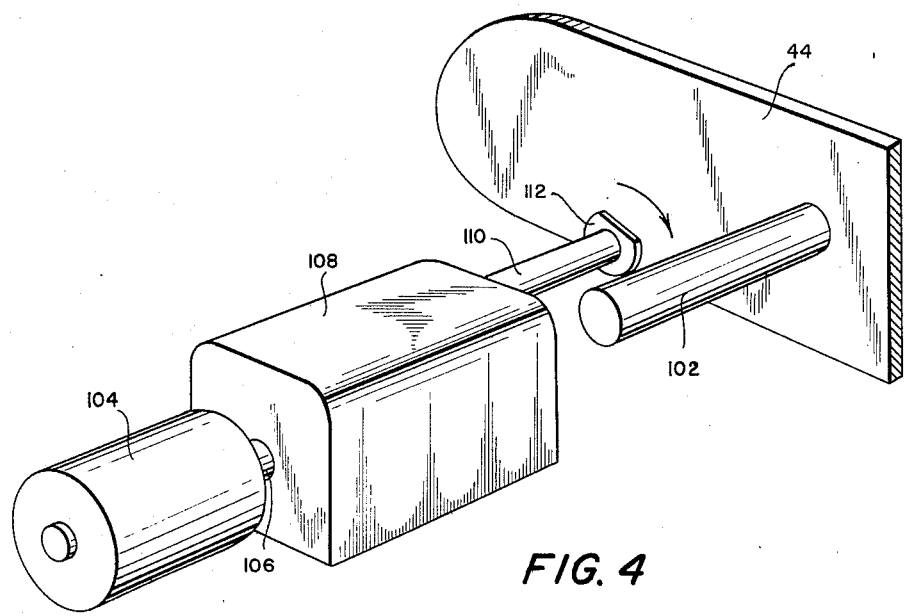
FIG. 4 is an enlarged perspective of suggested cam means utilized to reciprocate longitudinally the comb stairway.
Figure 5:
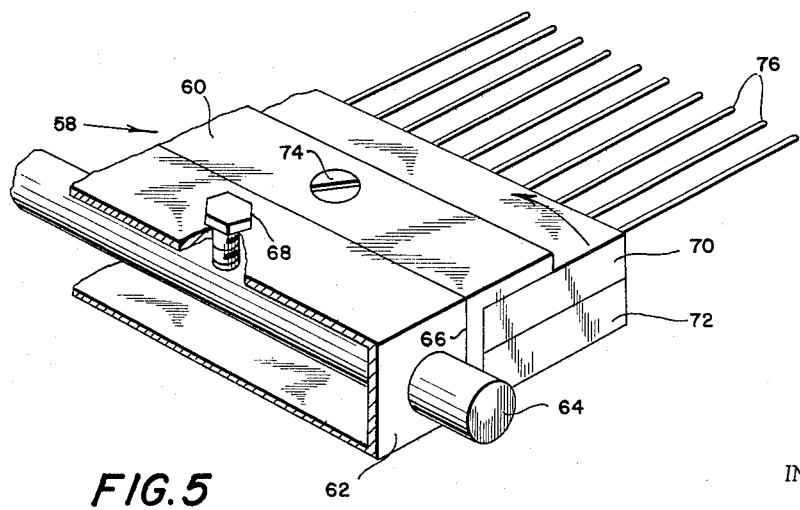
FIG. 5 is an enlarged, fragmentary perspective showing the means for adjustably positioning the individual comb elements within the stairway.

As illustrated in FIG. 5, the individual comb bars 58 are comprised of angle iron 60 mounting comb base pieces 70 and 72 which have aligned milled slots therein for securing the comb teeth 76 by means of epoxy or the like. Comb teeth 76 may be of piano wire dimension or 318 to the inch or higher in cross-section, depending upon the weight and handling characteristics of the matter to be sized. Bolts or screw elements 74 may be employed for securing the base pieces 70 and 72 to angle iron 60 which in turn is secured at face 66 to the individual comb channel 62. A transverse bar 64 extends through the comb channel 62 and is secured thereto by means of machine bolt or like element 68. As illustrated in FIG. 2, the upper and lower individual transverse bars 64 extend through comb stairway end plates 44 and 46 and into respective bearing blocks 80. The angular adjustment of the individual comb bars may be set by rotating shaft 64 within block 80 and securement by machine bolt or like element 78. Middle transverse shaft 63 is similarly secured to comb support pieces 50 and 52 by means of blocks 92 and 94 and set bolts 96 and 98. Bushings 114 are provided to enable a measure of longitudinal reciprocation of shaft 63, as induced by the reciprocating mechanism illustrated in FIG. 4 and described below.

An undersized recovery bin 82 is provided beneath comb stairway 18 and an oversized recovery bin 84, accessible by chute 98 having upstanding flanges 100, is provided immediately beyond the lowest and outermost comb piece 58.

A rocking bar 102, as illustrated in FIG. 4 may be provided for longitudinal rocking or reciprocation of the entire stairway assembly 18 so as to advance matter to be sized as a waterfall from comb to comb. Longitudinal reciprocating motor 104 may be mounted upon bracket 116 (FIG. 1) secured to upstanding leg by skirt element 117. As illustrated in FIG. 4, motor shaft 106 enters gear-box 108 and is connected by reduction or like gearing to cam shaft 110 having a semi-circular or like cam 112 attached at its end and contacting so as to longitudinally reciprocate bar 102. Resilient bushings 114, as illustrated in FIG. 2 may be provided, insuring a measure of longitudinal reciprocation of shafts 63 and stairway end plates 44 and 46 within comb support pieces 50 and 52.

In the modification illustrated in FIG. 6, conveyor table 212 having a delivery chute 216 is supported above a first comb stairway 218 and a second comb stairway 318. According to this modification, comb stairway 218 including top piece 224 and upstanding legs 222 may have a plurality of combs 270 mounted upon the shafts 264 in between end plates 244. An eccentric 230 (not illustrated) but similar to that indicated in FIG. 1 may be supported on top piece 224 and a similar longitudinal reciprocating means may also be provided. An undersized recovery bin 282 may be positioned beneath the first comb stairway 218.

At the end of comb stairway 218 a second delivery piece or chute 271 may be mounted upon comb endplate 344 by means of bracket piece 273. Comb stairway 318 contains like upstanding members 322, a top piece 324 upon which a similar eccentric means 330 may be positioned and individual comb elements 370 mounted between end plate 344 by means of shafts 364. A similar longitudinal reciprocating means (not illustrated) may also be provided.

An intermediate sized recovery bin 284 capable of recovering matter passing between comb teeth 370 is positioned beneath comb stairway 318. A final delivery chute 371 supported upon upstanding member 373 is provided for delivery of the oversized matter into oversized recovery bin 384.

Comb teeth 370 may be of finer size than comb teeth 270, insuring the separation and recovery of a finer sized material in bin 284. Matter recovered in bin 384 would have been oversized matter incapable of passing between teeth 270 and teeth 370.

As will be apparent, the conveyance of material to be sized upon the stairway of sizing combs is equivalent to the action of the material falling steps while the transverse reciprocation of the comb elements eliminates the binding or clogging inherent in the use of superposed screens. The comb teeth shanks may be of varying cross-section and the length protruding beyond the base pieces 70 and 72 (FIG. 5) may vary depending upon the size of material to be separated. The transverse reciprocation of the comb elements contributes to a constant cleaning of the comb teeth so as to eliminate clogging matter and actually assists in mixing the matter and enhancing the sizing action. By decreasing the angle of the combs, the speed of advance of conveyance down the stairway may be enhanced. Contrarily, by lifting and setting the comb ends upwardly, the speed of advance may be decreased.

Manifestly the rates, as well as amplitudes, of transverse and longitudinal reciprocating of combs may be readily varied, the distance between comb teeth in the stairway may be varied and three or more such stairways having comb teeth of variant spaces or thickness may be employed without departing from the spirit and scope of invention, as defined in the subjoined claims.

I claim:
1. Apparatus for sizing materials, comprising:
   (A) a headstand;
   (B) a combing stairway supported beneath said headstand, said stairway including a plurality of horizontally disposed comb bars, said comb bars arranged in descending order from one end of said stairway to the other end thereof to define a plurality of longitudinally extending descending paths for said materials, said comb bars having pluralities of horizontally disposed flexible teeth having first ends mounted within said comb bars and second ends partially superposing portions of teeth of comb bars located immediately therebelow in said descending order;
   (C) chute means for feeding said materials onto said comb bars, laterally reciprocating means mounted on said headstand and attached to said stairway for reciprocating said stairway laterally with respect to said longitudinally extending descending paths defined by said comb bars to impart vibration to said teeth in the planes defined by said horizontal comb bars; and
   (D) longitudinal reciprocating means mounted upon said headstand and attached to said stairway for selectively reciprocating said stairway so as to advance said materials to be sized as a waterfall along said longitudinally extending descending paths.

2. Apparatus for sizing materials as in claim 1, including means for varying the angular disposition of said comb bars.

3. Apparatus for sizing materials as in claim 1, including means for varying the rate and amplitude of lateral reciprocation of said stairway and vibration of said teeth.

References Cited by the Examiner

UNITED STATES PATENTS

| 5,616 | 6/1848 | Watson | 209—331 |
| 155,702 | 10/1874 | Brown | 209—314 |
| 744,516 | 11/1903 | Early | 209—314 |
| 850,447 | 4/1907 | Shumaker | 209—314 |
| 3,141,844 | 7/1964 | Brauchla et al. | 209—247 |

FOREIGN PATENTS

| 501,797 | 4/1920 | France. |
| 28,876 | 5/1883 | Germany. |
| 307,268 | 3/1929 | Great Britain. |
| 83,182 | 4/1935 | Sweden. |

References Cited by the Applicant

UNITED STATES PATENTS

| 399,025 | 3/1889 | Evans. |
| 790,171 | 5/1905 | Bechtel. |
| 2,578,944 | 12/1951 | Ramont. |
| 2,801,598 | 8/1957 | Dumas. |

FOREIGN PATENTS

| 21,977 | 1913 | Great Britain. |
| 774,461 | 11/1955 | Great Britain. |
| 67,704 | 1/1927 | Sweden. |
| 90,098 | 7/1937 | Sweden. |
| 98,286 | 1/1940 | Sweden. |

HARRY B. THORNTON, *Primary Examiner.*

R. HALPER, *Assistant Examiner.*